Patented Dec. 23, 1930

1,786,272

UNITED STATES PATENT OFFICE

FRITZ STRAUB AND WALTER ANDERAU, OF BASEL, SWITZERLAND, ASSIGNORS TO SOCIETY OF CHEMICAL INDUSTRY IN BASLE, OF BASEL, SWITZERLAND

AZO DYESTUFFS CONTAINING METALS AND PROCESS OF MAKING SAME

No Drawing. Application filed August 26, 1929, Serial No. 388,614, and in Switzerland September 8, 1928.

The present invention relates to new azo-dyestuffs. It comprises the process of making these dyestuffs, the dyestuffs themselves, and the material that has been dyed with the new dyestuffs.

It has been found that valuable dyestuffs dyeing remarkably fast tints are obtained by combining the azine of the formula

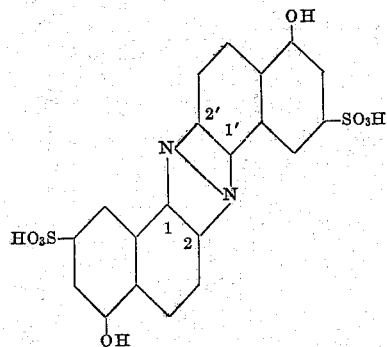

with aromatic diazo-compounds.

If sulfonated or unsulfonated diazo-components are used which contain lake-forming groups the dyestuffs may be treated with an agent which yields metal.

The azo-dyestuffs may be made in substance or on a suitable substratum.

As suitable metals for the manufacture of products containing metal may be named all those which are capable of forming complex compounds, such as chromium, copper, iron, manganese, tin, aluminum, nickel, cobalt, titanium, cerium, uranium, or the like.

The following examples illustrate the invention, the parts being by weight:—

Example 1

47.2 parts of 5:5'-dihydroxy-7:7'-disulfo-dinaphthazine are dissolved together with 25 parts of sodium carbonate in 500 parts of water and combined with the diazo-body from 45 parts of 4-chloro-2-amino-phenol-6-sulfonic acid. When coupling is at an end the dyestuff is salted out. It is dark powder, soluble in dilute acetic acid to a red-orange solution, in dilute alkalies to a blue solution and in concentrated sulfuric acid to a greenish-black solution. Cotton is dyed in an alkaline bath containing Glauber's salt blue tints, which pass to fast grey-blue tints when afterwards treated with copper salts.

Example 2

The dyestuff described in the preceding example is dissolved in 3000 parts of water and at the boiling point 50 parts of crystallized copper sulfate are added, whereupon the copper compound of the dyestuff is formed and may be salted out. The dry copper compound is a dark powder which dissolves in water and dilute alkalies to a blue solution; in concentrated sulfuric acid to a greenish black solution. Cotton is dyed by this dyestuff in a bath alkaline with sodium carbonate blue grey tints which are fast, and especially fast to light.

Example 3

92 parts of the disazo-dyestuff from 5:5'-dihydroxy-7:7'-disulfo-1:2':1':2-di-naphthazine and diazotized 4-chloro-2-amino-1-phenol-6-sulfonic acid are dissolved in 2500 parts of water and the solution is mixed with one of chromium fluoride corresponding with 30 parts of $Cr_2O_3$, whereupon the mixture is boiled for 15 hours in a reflux apparatus. By evaporation and precipitation by addition of common salt, the new chromium compound may be separated. When dry, it is a dark powder, soluble in water and dilute alkalies to a green-blue solution and in concentrated sulfuric acid to a brown-black solution. Cotton and artificial silk, such as viscose silk, are dyed by this dyestuff in a bath alkaline with sodium carbonate fast green grey tints and the like tints are obtained on wool and silk in an acid bath.

Example 4

In presence of sodium carbonate 47.2 parts of 5:5'-dihydroxy-7:7'-disulfo-1:2':1':2-dinaphthazine are coupled with the diazo-compound from 44 parts of 4-nitro-2-aminophenol-6-sulfonic acid and when completely coupled the product is salted out. When dry, it is a black powder which dissolves in dilute acid to an orange solution; in dilute alkalies to a green solution and in concentrated sulfuric acid to a blackish solution. Cotton is dyed by this dyestuff in an alkaline bath grey-green tints which by a subsequent treatment with copper become fast green-grey.

Example 5

90 parts of the disazo-dyestuff of the foregoing example are dissolved in 3000 parts of hot water and there is added a saturated solution of 50 parts of crystallized copper sulfate, whereupon the copper compound is immediately formed. It is separated by common salt and the separated material is dried. It is a grey black powder, soluble in water and in dilute alkalies to a dark green blue solution and in concentrated sulfuric acid to a blackish solution. It dyes cotton in a bath alkaline with sodium carbonate and containing Glauber's salt green-grey fast tints.

Example 6

90 parts of the disazo-dyestuff from 5:5'-dihydroxy-7:7'-disulfo-1:2':1':2-dinaphthazine and 4-nitro-2-aminophenol-6-sulfonic acid are dissolved in 3500 parts of water and there is added a solution of chromium fluoride corresponding with 30 parts of $Cr_2O_3$. The whole is then heated for 16 hours to boiling. By evaporation and salting out the new chromium compound may be isolated. When dry, it is a dark powder soluble in water and dilute alkalies to a green solution and in concentrated sulfuric acid to a brown-black solution. Cotton and viscose silk are dyed in an alkaline bath containing Glauber's salt olive-green tints. Wool and silk are dyed in an acid bath like tints.

Example 7

Instead of the chromium fluoride used in Example 6 there is used a mixture of a solution of 25 parts of crystallized copper sulfate and a solution of chromium fluoride corresponding with 25 parts of $Cr_2O_3$; the whole is heated in a reflux apparatus for 16 hours. By addition of common salt, the complex compound is caused to separate. When dry, it is a dark powder, which dissolves in water to a blue violet solution; in dilute alkalies to a blue solution and in concentrated sulfuric acid to a blackish solution. Cotton is dyed by it in a bath alkaline with sodium carbonate and containing Glauber's salt green grey tints.

Example 8

12 parts of 5:5'-dihydroxy-7:7'-disulfo-1:2':1':2-dinaphthazine are dissolved together with 4 parts of calcined sodium carbonate in 200 parts of water and 10 parts of sodium bicarbonate are added. The solution is mixed with the diazo-body from 11 parts of aniline-4-sulfonic acid and the mixture is kept at 6–8° C. until the diazo-body has disappeared. The dyestuff is salted out. When dry, it is a dark powder, soluble in water to a red brown solution, in caustic soda solution or dilute sodium carbonate solution to a blue violet solution and in concentrated sulfuric acid to a green solution. It dyes silk and wool in an acid bath containing Glauber's salt red brown tints.

Example 9

Instead of sulfanilic acid used in Example 8 there is here used the corresponding quantity of the diazo-compound from para-nitraniline and the rest of the procedure is as described in that example. There is obtained a blackish dyestuff which dissolves in water to a brown solution; in sodium carbonate solution to a blue-violet solution and in dilute caustic soda solution to a blue-green solution. In concentrated sulfuric acid it dissolves to an olive green solution. It dyes silk and wool in an acid bath brown tints and cotton in an alkaline bath containing Glauber's salt olive tints.

Example 10

Cotton is handled in a solution containing per litre 12 grams of 5:5'-dihydroxy-7:7'-disulfo-1:2':1':2-dinaphthazine, 5 grams of caustic soda solution of 30 per cent. strength and 15 grams of Turkey red oil. The dyestuff is developed without drying by means of diazotized 4-chloro-2-aminodiphenylether; after soaping the goods have a dark brown dyeing.

By adding sodium hydrosulfite to the padding bath the azine can be brought into the form of hydroazine on the fibre. In this case the goods are hung for a short time before the development. The dyeings thus obtained are somewhat stronger than by the method of the previous paragraph.

Example 11

A dye-bath is prepared with 2 parts of the dyestuff of Example 1 and 30 parts of Glauber's salt.

100 parts of cotton are entered at 30–40° C. and the bath is heated within ½–¾ hour to boiling, dyeing being continued for ½–¾ hour. The goods are then rinsed in the usual manner and the dyeing is coppered in a second bath. To this second bath are added 2 parts of crystallized copper sulfate in solution and 1–2 parts of acetic acid, the goods being handled in the bath for ½ hour at 60–70° C. They are then rinsed in the usual manner and dried. There are obtained grey tints of very good properties of fastness.

A like result is obtained when dyeing in presence of copper sulfate.

*Example 12*

A dye-bath is prepared with 2 parts of the dyestuff of Example 4 and 30 parts of Glauber's salt. 100 parts of cotton are entered at 30–40° C., and the bath is heated within ½–¾ hour to boiling. Dyeing is then continued for ½–¾ hour and the goods subsequently rinsed.

The goods are then handled for ½ hour at 60–70° C. in a second bath which contains dissolved in it 1 part of chromium fluoride. Rinsing and drying follow. Greenish grey tints are obtained of excellent fastness.

The result is similar if the dyeing is conducted in the presence of a chromium salt.

*Example 13*

For 100 parts of silk 2–3 parts of the dry dyestuff of Example 2 are dissolved in the quantity of water necessary for the dyeing. To this solution 5–8 parts of acetic acid are added and the goods are entered at 50–60° C., the bath being then gradually heated to 80° C. and maintained at this temperature for ¾ to 1 hour. The goods are then washed, brightened in the usual manner and dried. Silk is dyed fast grey tints.

*Example 14.*

100 parts of well-boiled out or thoroughly wetted cotton are dyed in a bath comprising 2500 parts of water, to which have been added 2 parts of the dyestuff of Example 5, dissolved in 10–15 times their weight of hot water. The goods are entered at 20–35° C. and the bath is heated to boiling in the course of ½–¾ hour; there are then added to the bath 25–30 parts of Glauber's salt and the goods are handled at the boiling temperature for 10–15 minutes, whereupon the bath is cooled to 85° C. and the goods handled at this temperature for another ½ hour; they are then washed and dried. The dyeing can also be conducted in a feebly alkaline or feebly acid bath. There are obtained fast green grey tints.

What we claim is:—

1. Process for the production of metalliferous azo-dyestuffs, consisting in combining with diazo-compounds containing lake-forming groups in ortho-position to the diazo-group the 5:5'-dihydroxy-7:7'-disulfo-1:2':1':2-dinaphthazine of the formula

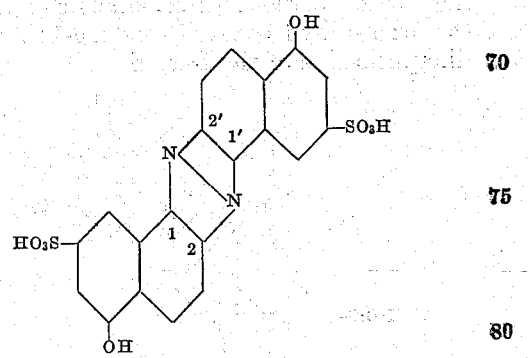

and treating the products thus obtained with an agent which yields metal capable of forming lakes.

2. Process for the production of metalliferous azo-dyestuffs, consisting in combining with diazo-compounds containing lake-forming groups in ortho-position to the diazo-group the 5:5'-dihydroxy-7:7'-disulfo-1:2':1':2-dinaphthazine of the formula

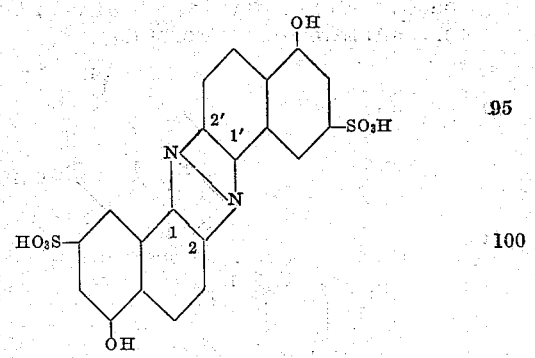

and treating the products thus obtained with an agent which yields metal of the atomic weight ranging between 48 and 65.

3. Process for the production of metalliferous azo-dyestuffs, consisting in combining with diazo-compounds containing lake-forming groups in ortho-position to the diazo-group the 5:5'-dihydroxy-7:7'-disulfo-1:2':1':2-dinaphthazine of the formula

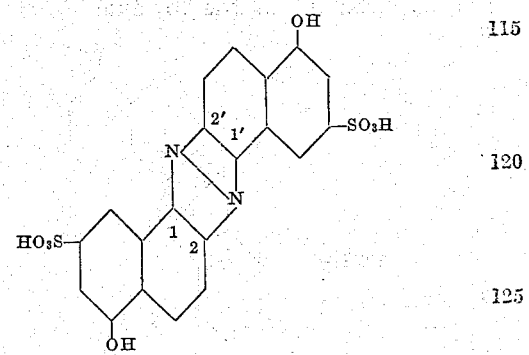

and treating the products thus obtained with an agent which yields metal of the atomic weight ranging between 52 and 63.6.

4. Process for the production of metalliferous azo-dyestuffs, consisting in combining with ortho-hydroxy-diazo-compounds the 5:5'-dihydroxy-7:7'-disulfo-1:2':1':2-dinaphthazine of the formula

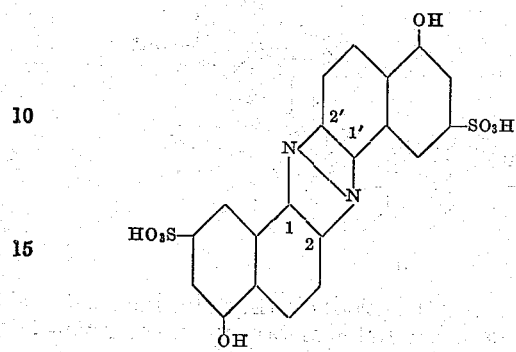

and treating the products thus obtained with an agent which yields metal of the atomic weight ranging between 52 and 63.6.

5. Process for the production of azo-dyestuffs containing copper, consisting in combining with ortho-hydroxy-diazo-compounds the 5:5'-dihydroxy-7:7'-disulfo-1:2':1':2-dinaphthazine of the formula

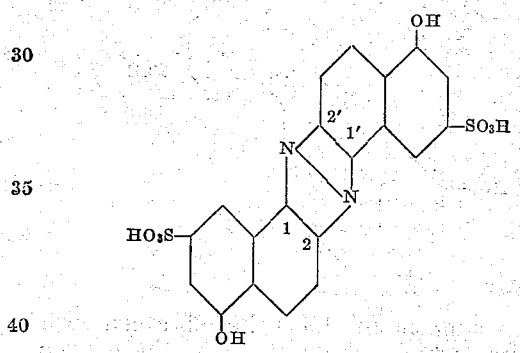

and treating the products thus obtained with an agent which yields copper.

6. As new products the metalliferous azo-dyestuffs obtained by combining with diazo-compounds containing lake-forming groups in ortho-position to the diazo-group the 5:5'-dihydroxy-7:7'-disulfo-1:2':1':2-dinaphthazine of the formula

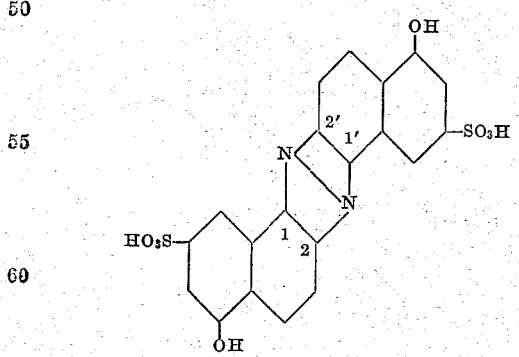

and treating the products thus obtained with an agent which yields metal capable of forming lakes, which products form dark to blackish powders which dissolve in water and dilute alkalies to blue to green-blue solutions, and dye fibers of animal and vegetable origin olive-green and green-grey to blue-grey tints.

7. As new products the metalliferous azo-dyestuffs obtained by combining with diazo-compounds containing lake-forming groups in ortho-position to the diazo-group the 5:5'-dihydroxy-7:7'-disulfo-1:2':1':2-dinaphthazine of the formula

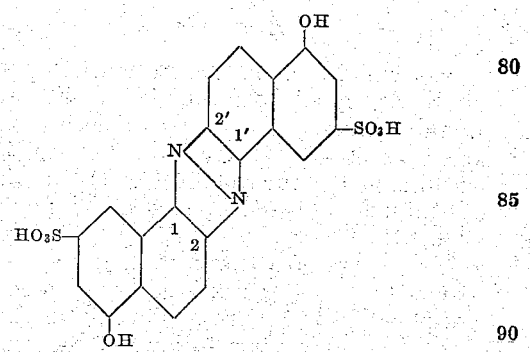

and treating the products thus obtained with an agent which yields metal, of the atomic weight ranging between 48 and 65, which products form dark to blackish powders which dissolve in water and dilute alkalies to blue to green-blue solutions, and dye fibers of animal and vegetable origin olive-green and green-grey to blue-grey tints.

8. As new products the metalliferous azo-dyestuffs obtained by combining with diazo-compounds containing lake-forming groups in ortho-position to the diazo-group the 5:5'-dihydroxy-7:7'-disulfo-1:2':1':2-dinaphthazine of the formula

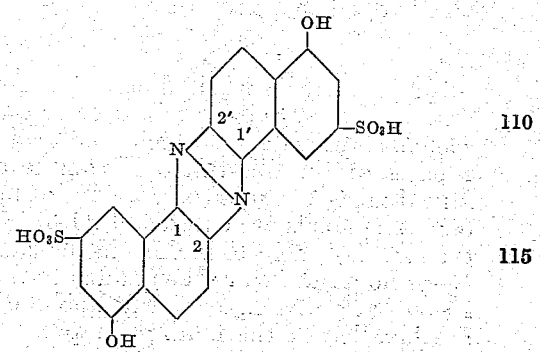

and treating the products thus obtained with an agent which yields metal, of the atomic weight ranging between 52 and 63.6, which products form dark to blackish powders which dissolve in water and dilute alkalies to blue to green-blue solutions, and dye fibers of animal and vegetable origin olive-green and green-grey to blue-grey tints.

9. As new products the metalliferous azo-dyestuffs obtained by combining with ortho-hydroxy-diazo-compounds the 5:5'-dihydroxy-7:7'-disulfo-1:2':1':2-dinaphthazine of the formula

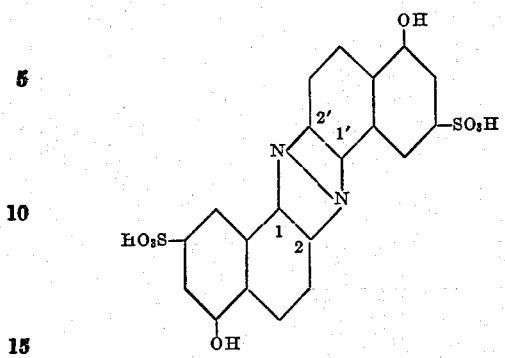

and treating the products thus obtained with an agent which yields metal, of the atomic weight ranging between 52 and 63.6, which products form dark to blackish powders which dissolve in water and dilute alkalies to blue to green-blue solutions, and dye fibers of animal and vegetable origin olive-green and green-grey to blue-grey tints.

10. As new products the azo-dyestuffs containing copper, obtained by combining with ortho-hydroxy-diazo-compounds the 5:5'-dihydroxy-7:7'-disulfo-1:2':1':2-dinaphthazine of the formula

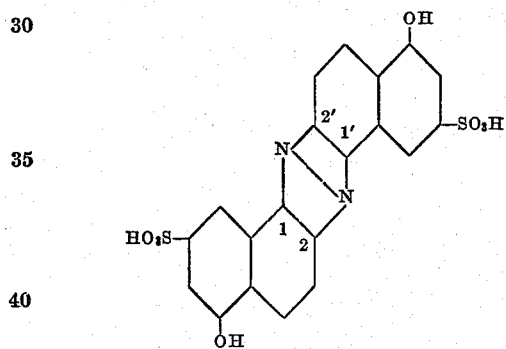

and treating the products thus obtained with an agent which yields copper, which products form dark to blackish powders which dissolve in water and dilute alkalies to blue to green-blue solutions, and dye fibers of animal and vegetable origin olive-green and green-grey to blue-grey tints.

11. Material dyed with the products of claim 6.

12. Material dyed with the products of claim 7.

13. Material dyed with the products of claim 8.

14. Material dyed with the products of claim 9.

15. Material dyed with the products of claim 10.

In witness whereof we have hereunto signed our names this 14th day of August, 1929.

FRITZ STRAUB.
WALTER ANDERAU.